United States Patent Office

3,442,388
Patented May 6, 1969

3,442,388
ARTIFICIAL KIDNEY HAVING A CORRUGATED, CONVOLUTED MEMBRANE
David B. Pall, Roslyn Estates, N.Y., assignor to Pall Corporation, Glen Cove, N.Y., a corporation of New York
Filed Mar. 27, 1967, Ser. No. 626,144
Int. Cl. B01d 13/00, 27/06, 29/06
U.S. Cl. 210—321       15 Claims

ABSTRACT OF THE DISCLOSURE

An artificial kidney is provided in which blood is purified by dialysis. The kidney employs a corrugated semipermeable dialysis membrane disposed within a housing having inlets and outlets. The corrugations of the membrane define the passages within the housing for flood flow and dialysate flow and provide a dialyzing connection between the passages.

Specification

This invention relates to an artificial kidney in which blood is purified by dialysis and more particularly, it relates to a compact and efficient artificial kidney of a high dialysis rate.

Kidney diseases, such as nephritis, which interfere with the function of the kidney to remove waste and excess water from the blood, represent a formidable challenge to medical science. The function of the kidney is vital to human life, since unless waste material and excess water are removed from the blood, the person will die. Absent a cure for, or during treatment of, the disease research has sought for some means for artificially carrying out the function of the ailing kidney, and so prolong the life of the patient. For this purpose, devices for purifying the blood, such as the Kiil kidney, which purifies blood by dialysis, have been provided. However, the Kiil kidney and other such devices have proved inadequate to the task, since they are not very efficient. There are other varieties of apparatus for purifying blood; however, there are very few in existence, and they are very expensive. Until now, they have helped only a few of the numerous sufferers of kidney disease.

The Kiil kidney and like devices are based on the principle that waste materials can be removed by dialysis through a membrane, through which desirable blood components do not pass. This can be done, since when the wastes are dissolved in the blood, they are present in a relatively high concentration. Therefore, they will tend to diffuse through a membrane into a dialysate fluid, such as a buffered saline solution, which has a very low concentration of waste material, on the opposite side of the membrane. The blood is left relatively free of waste. Excess water can at the same time be removed from the blood by ultrafiltration, through the membrane. This can be accomplished by maintaining a positive pressure differential between the blood and the dialysate fluid on the opposite side of the membrane.

In providing an artificial kidney for the purification of blood, it is desirable to minimize possible hazards to the patient in a large extracorporeal blood volume and a long treatment time. By minimizing extracorporeal blood volume, there is much less chance that a large amount of blood could be lost should some failure occur. Moreover, by reducing the patient treatment time, there is less time during which a failure in the apparatus could injure the patient.

In order to achieve these objectives in an artificial kidney which purifies blood by dialysis, it is necessary to have as high a dialysis rate per unit area of the dialysis membrane as possible, and to provide a large membrane area for dialysis in a small volume. By increasing both rate of dialysis per unit area and the area available for dialysis, the clearance rate, i.e., the rate at which a given volume of blood is purified of waste material and excess water, can be increased for an artificial kidney of a given volume.

It is important to keep the volume of the blood contained in the artificial kidney small, and thus the artificial kidney itself small, since in starting up, the kidney must be primed with blood. Thus, blood either must be supplied from an outside source or the patient must use his own blood to prime the kidney. Naturally, a patient cannot afford to use a large amount of his blood to prime the kidney. Moreover, it is an object of this invention that the artificial kidney provided be suitable for home use and not require the facilities or the personnel of a hospital for its use. Thus, an outside source of blood may be unavailable and thus the patient will of necessity be required to use his own blood to prime the kidney. Therefore, the volume of blood required must be kept to a minimum.

As indicated above, however, although the volume must be kept small, the membrane area for dialysis and the dialysis rate through a given area must both be increased. The dialysis rate and the membrane area, however, cannot be increased by introducing an unduly high pressure drop across the kidney, or a very high flow rate through the kidney, or high turbulence in the blood flow. Although all of these factors are known to improve the dialysis rate of dissolved material through membrane, they cannot be used to advantage in hemodialysis. This is due to the fact that high pressure drops, high flow rates and turbulence result in fluid flows having quite high Reynolds numbers. Such forces result in hemolysis, i.e., the destruction of red blood corpuscles, which can prove fatal to the patient.

Moreover, it is desirable that adequate blood flow rates through the artificial kidney be obtained at arterial pressure alone, without the assistance of a pump. Thus, for these reasons the Reynolds numbers of the fluid flows in the artificial kidney must be kept low.

The Kiil kidney comprises a plurality of large flat membranes, supported by a plurality of grooved plates in a sandwich-type construction. Each pair of grooved plates normally is provided with two taut membranes between them. Dialysate is normally flowed through the assembly between the grooves of each plate on one side of each membrane and blood is normally flowed through the assembly between the two membranes. The blood is normally of a higher absolute pressure than the dialysate fluid. Thus, the blood pressure keeps the membranes spaced apart. The Kiil kidney as normally constructed has about 0.9 square meter of membrane area and it is relatively large in size. Its external dimension are of the order of one foot by three feet. Flow is introduced at one end of the kidney and allowed to flow long the three foot long membranes to the other end.

Due to its size and sandwich construction, fabrication of the assembly of the Kiil kidney is quite intricate. The plates must be carefully formed, each membrane surface must be sealed to the plates by gaskets or the like, and each membrane and each plate must be quite precisely aligned with one another. Moreover, after each usage of the assembly, the membranes are replaced. Thus, it must be torn down, rebuilt, and resterilized. It can be seen that a great amount of time is required in the preparation of the kidney for each usage, and the careful manufacturing of its components, thus making it quite expensive.

The applicant has found that the distance between membrane surfaces in an artificial kidney is very significant to the dialysis rate obtained. In the Kiil kidney, however, it is almost impossible to maintain a precise spacing of one membrane to the next. This is due to the fact that the membrane is quite thin in relation to the spacing of the grooves. Thus, each segment of the membrane has a high blood loading on it, and it is forced by the pressure of the blood to deflect into each groove. This causes uneven spacing of the membrane surfaces. Due to this fact, inter alia, the Kiil kidney has a relatively low dialysis rate.

In accordance with the instant invention, an artificial kidney is provided which comprises a housing, a corrugated semipermeable dialysis membrane disposed in the housing, in a manner to define separate blood flow and dialysate flow chambers on opposite sides of the membrane, said corrugations being spaced from about 0.004 inch to about 0.012 inch apart on the blood flow side of the membrane; and inlet and an outlet in each chamber, the fluid flow from the inlet to the outlet proceeding along the corrugations for a unit length not greater than about 12 inches, said corrugated membrane providing a dialyzing connection between the blood flow chamber and the dialysate flow chamber, so that dissolved wastes in the blood flow chamber can diffuse through the membrane into the dialysate fluid in the dialysate chamber, and leave the blood relatively waste-free.

The preferred embodiment of this artificial kidney of the invention comprises a housing, a semipermeable dialysis membrane disposed in the housing in a manner to define separate blood flow and dialysate flow passages on opposite sides of the membrane, said membrane being formed in at least one spaced apart convolution and a plurality of corrugations disposed along the convolution, and said corrugations of the membrane being substantially uniformly spaced from about 0.004 inch to about 0.012 inch apart on the blood flow side thereof; a manifold in the housing on one side of the membrane and between the sides of the convolution of the membrane, said manifold having a flow inlet on one side thereof and a flow outlet on the other side thereof, the manifold, and the corrugations of the membrane defining passages for flow of one fluid on one side of the membrane between the manifold inlet and outlet; a flow inlet and a flow outlet in the housing on the opposite side of the membrane, the housing and the corrugations of the membrane defining passages for flow of the other fluid on the opposite side of the membrane; the inlets and the outlets being located in the housing and in the manifold to deliver and receive flow to and from the passages, the flow proceeding from each inlet to each outlet along the corrugations for a unit length of not more than about 12 inches, the membrane providing a dialyzing connection between the flow passages so that dissolved wastes in the blood can diffuse through the membrane into the dialysate fluid leaving the blood relatively waste-free.

This invention also provides a process for removing waste material and excess water from blood by dialysis and ultrafiltration, respectively, through a semipermeable dialysis membrane, which comprises flowing blood through a dialysis and ultrafiltration zone having a width within the range from about 0.004 inch to about 0.012 inch over a path having a unit length of less than about 12 inches on one side of a semi-permeable membrane with dialysate on the other side of the membrane, the blood being under a higher pressure than the dialysate fluid, whereby dissolved wastes in the blood pass from the blood to the dialysate fluid by diffusion through the membrane and excess water in the blood passes through the membrane into the dialysate fluid by ultrafiltration.

The artificial kidney of the instant invention for equal membrane area provides almost twice the clearance rate of a Kiil kidney. It can be inexpensively constructed since it is quite simple in structure and its selling price can be very low. Therefore, the artificial kidney can be disposable, and sold in a sterile disposable unit. It has a long shelf life, and no pump is required to ensure an adequate blood flow through the assembly. Moreover, the extracorporeal blood volume and treatment time required are held to a minimum.

It has been found that the rate of dialysis through a membrane is controlled by the thickness of the stagnant boundary layer of fluid that is always present adjacent to the membrane. In order to increase the dialysis rate, it is necessary to decrease the thickness of the boundary layer. It has been determined in accordance with this invention that the thickness of the boundary layer can be decreased by purely geometrical considerations.

For example, in a system where flow proceeds between two broad flat plates, the boundary layer cannot exceed half the distance between the plates. Moreover, for equal average velocities the smaller the passage the higher the shear stresses applied to the boundary layer by the flow. This also tends to reduce the thickness of the boundary layer along the membrane.

These geometrical considerations, however, are limited by the fact that fluid flows having high Reynolds numbers which are normally associated with other dialysis systems cannot be used in this invention since, as explained above, they are destructive of red blood corpuscles. In fact, only fluid flows having Reynolds numbers of less than 100 and preferably below 50 occur and are permissible in the artificial kidney of the instant invention.

Since high Reynolds numbers cannot be used, the geometrical considerations for dialysis of laminar flow, rather than turbulent flow, will determine the dialysis rate through the membrane.

These geometrical considerations have been found by the applicant to be controlled by the equation:

$$k_x = C_k (V/DL)^{1/2}$$

wherein $k_x$ is the film diffusion coefficient; $C_k$ is a constant depending only upon the characteristics of the fluid and not the geometry of the system; $V$ is the velocity of the flow; $L$ is the length of undisrupted flow path; and $D$ is the characteristic dimension of the cross-section of the flow path, e.g., the distance between the membrane surface of a corrugation.

Since $k_x$, the film diffusion coefficient, is to be maximized, $D$ and $L$ should be minimized.

The applicant has found that a corrugated membrane can provide relatively small passages and relatively short flow paths while still providing a high area for dialysis in a compact low volume package. Moreover, the applicant has also found that a membrane that is both corrugated and convoluted can be employed to provide an even higher clearance rate since in such an assembly the length of the undisrupted flow, i.e. the unit length of the flow can be reduced, although no diffusion area is lost. The structure of this assembly will be more particularly described below.

It is to be noted that the term "corrugations" as used herein refers to the surface configuration of the membrane which is a series of ridges and depressions. The term "convolution" as used herein refers to the folding of the membrane back upon itself. The convolution of the membrane, as described herein, is normally large relative to the corrugations, and the corrugations are normally formed across or along the convolutions.

The membrane used in this invention is a semi-permeable membrane, preferably made of regenerated cellulose. Such a membrane is somewhat resilient. Membranes made of synthetic polymers, such as polypeptide films and silicones can also be used. The membrane should be from about 0.00001 to about 0.005 inch thick and is preferably from about 0.0001 to about 0.0015 inch thick.

The membrane is formed into a corrugated sheet with corrugations within the range from about ¼ to about 1 inch in depth and preferably within the range from about ⅜ to about ¾ inch in depth.

The membrane face to membrane face spacings of the corrugations are typically within the range from about 0.004 inch to 0.012 inch and preferably within the range from about 0.006 to about 0.010 inch to form approximately within the range from about 20 to about 50 corrugations per inch.

Although it is desirable to keep the passages between the corrugations quite small, to keep the boundary layer thin, they should not be smaller than the spacing indicated above. If they are too small, the spacing between one corrugation and the next cannot be held to a precise figure. Moreover, a high pressure drop and a low flow capacity will result, which are undesirable.

The flow path through the assembly is along the corrugations which are along the width of the membrane. Thus, the membrane should generally be less than about 12 to 14 inches in width.

In one embodiment the housing is generally in the shape of a flat box. The housing is generally small in volume since no more than 300 ml. and preferable no more than 125 ml. of blood should be required to fill the blood chamber. The sections, if desired, which can be joined along their sides when assembled. The housing can also be provided with end caps to seal its ends. Any material that is inert to the blood and to the dialysate fluid, and which can be sterilized, can be used. Transparent and translucent materials, such as polymethyl methacrylate, polyvinyl chloride, polyethylene and polypropylene are preferred for the housing. Polystyrene, nylon, Teflon, and polycarbonates can also be used. Corrosion-resistant metals, such as stainless steel, chromium and nickel are also suitable.

The corrugated membrane is placed across the interior of the housing to define a dialysate flow chamber on one side of the membrane and a blood flow chamber on the other.

Both the dialysate flow chamber and the blood flow chamber have inlets and outlets and these are provided in the housing in positions such that flow proceeds from the inlet along the length of the corrugations and then to the outlet of each chamber. The fluids are passed from the inlet to the outlet, preferably countercurrent to each other. The unit length of the flow path in the housing will to some degree depend upon the location of the inlet and outlet and the configuration and size of the membrane in the housing. The optimum flow path unit length for a given fluid, however, in accordance with the equation given above, is that which is the shortest possible for a given system. In determining what is the shortest possible flow path, it must be borne in mind that enough area must be provided in the housing to ensure a sufficient clearance rate for the blood to keep patient treatment time low, and the volume of the assembly must also be kept low. Moreover, as the unit flow path is made shorter, the problems of distributing and manifolding flow to ensure that flow is uniformly distributed over the entire surface area of the membrane become extremely difficult. The applicant has determined that in a system employing a corrugated membrane and which employs a flow along the length of the corrugations, the optimum unit flow length is less than about 12 inches and preferably within the range from about 6 to about 12 inches. It is to be noted that the unit flow path or unit length referred to the above is the path of undisrupted flow along the membrane. If the flow is disrupted, e.g., by a sudden change is cross-sectional area or configuration, the buildup of the boundary layer along the membrane is also disrupted; therefore enhancing the dialysis rate through the membrane.

The membrane is bonded at its ends and sides in position in the housing to prevent leakage between the blood flow passages and the dialysate flow passages. The membrane must be firmly bonded in place so that no leakage can occur, and this can be accomplished by a suitable adhesive, such as a resin adhesive which will not contaminate the blood. Any other means of bonding which can accomplish this without damage to the membrane or contamination of blood can be used.

Since the membrane is quite thin and normally resilient, it can be subject to some deflection or distention due to the pressure of the blood. Moreover, its corrugated shape also tends to make the membrane even more flexible. In the instant assembly, a foraminous support for the membrane is provided to prevent deflection or distention of the membrane and maintain the precise spacing of the corrugations. This support preferably comprises a woven mesh shaped to match the membrane. A mesh support is particularly desirable since it provides firm support for the membrane and little interference with the dialysis of wastes through the mmebrane. This is due to the fact that the surface of a woven mesh is not flat, so that the mesh and the membrane only touch each other at the high points of each warp and weft strand of the mesh.

It is also possible, however, to provide other foraminous membrane supports, such as corrugated mesh which is folded to match the membrane. Other foraminous or porous supports, such as foraminous arms or the like, can also be used. The support can be made from generally any material that can be sterilized. Plastics, such as polyvinyl chloride and polypropylene are preferred, although stainless steel and nickel can also be used. The support preferably has openings of greater than 0.0005 inch.

If desired, the support can be bonded by any means such as a resin or solvent adhesive at its points of contact to the membrane. However, the support need not be bonded to the membrane. This is due to the fact that normally the support is located on the dialysate side of the membrane and the dialysate side is of a lower pressure than the blood side. There is normally a sufficient pressure differential across the membrane to thereby hold the membranes against the support. Moreover, since the support is on the dialysate side any possible contamination of the blood by the support is avoided.

In another embodiment of this invention, the membrane is both corrugated and convoluted. That is, the membrane is formed into a corrugated sheet which is then folded back on itself in the housing with the corrugations extending along the convolution. One convolution of the membrane is preferred since this simplifies the manifolding of flow to the flow chambers or passages in the housing. However, several convolutions of the membrane can also be provided.

By such a construction, the area available for dialysis can be maintained the same as that in the previous embodiment. However, the length of undisrupted flow path will be cut in half. This configuration of the membrane can conveniently be accommodated in a housing which is somewhat shorter in length than the housing of the previous embodiment although thicker. The total volume of the housing will be substantially the same as that of the previous embodiment.

In this embodiment, fluid on one side of the membrane will be introduced through a flow manifold which forms a portion of the housing. The manifold is preferably in the form of plate or flat bar which is located between the convolution sides of the membrane transversely across the housing dividing the housing into upper and lower sections. The manifold extends along the entire length of the housing. Passages for flow along the length of the corrugations are formed between the corrugations and the manifold in both sections. The flow inlet is located at one end of the manifold and introduces flow to the flow passages in one section, e.g., the upper section, at one end thereof. This flow is free to pass along the length of the manifold to the other end of the housing. The manifold at this end of the housing is provided with a flow crossover channel through which the flow is free to proceed into the other section.

The manifold is also provided with a flow outlet which is at the same end of the housing as the flow inlet. However, the outlet communicates with the flow passages on the opposite side of the manifold from the inlet, e.g., the lower section. Flow to the outlet proceeds from the crossover channel at the opposite end of the membrane along the length of the corrugations to the outlet.

The flow of the other fluid is introduced and withdrawn from the assembly through a fluid inlet and a fluid outlet formed in the housing. This fluid is preferably the blood and it proceeds through passages defined by the housing and the corrugations along the length of the corrugations through a series of crossover channels to the outlet in a manner similar to flow of the fluid on the other side of the membrane.

It is to be noted that the fluid flow passages on one side of the membrane do not communicate with the fluid flow passages on the other side of the membrane except by dialysis or ultrafiltration through the membrane. Either of the passage systems can be used either for blood or for dialysate fluid. The embodiments briefly described above will be described in greater detail in connection with the following drawings in which.

Figure 1:
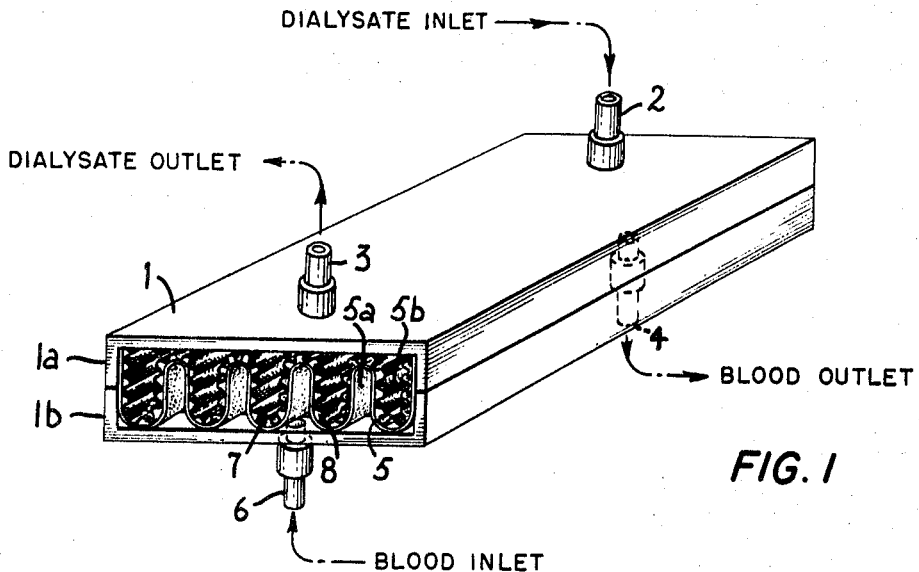
FIGURE 1 is a view in perspective and partially in cross-section of an artificial kidney in accordance with this invention.

In FIGURE 1, an artificial kidney in accordance with this invention is shown. It comprises a plastic transparent housing 1 having upper and lower sections 1a and 1b. These sections are bonded together in a fluid-tight seal by a resin adhesive. The housing generally has the shape of a flat box. A corrugated membrane 5 is located within the housing and is sealed at its ends to define noncommunicating blood and dialysate flow chambers 5a and 5b in the housing. The membrane is a semipermeable regenerated cellulose membrane, 0.001 inch thick, and is formed in 31 corrugations to the inch. The spacing between the membrane surfaces of each corrugation is about 0.008 inch and each corrugation is about 5/8 inch deep. A dialysate inlet 2 and a dialysate outlet 3 are provided in Section 1a of the housing to permit dialysate flow into the dialysate chamber 5b and a blood inlet 6 and a blood outlet 4 are provided in the bottom section of the housing 1b for blood flow in the blood flow chamber 5b on the opposite side of the membrane 5. The dialysate inlet 2 and dialysate outlet 3 and the blood inlet 6 and blood outlet 4 are located at the opposite ends of the membrane and as can be seen from the drawings, dialysate flow runs counter-currently to blood flow. The length of the undisrupted flow path along the corrugations is 10 inches.

A plastic mesh support screen 7 formed in a plurality of small corrugations 8 and in a shape to match the corrugations of the membrane is disposed in the housing, adjacent to the membrane on the dialysate flow side thereof. This mesh is made of plastic and has a 0.005 inch opening. The apex of each corrugation of the mesh is bonded to the membrane to provide firm support for the membrane and hold the precise spacing of the corrugations.

In operation, flow of dialysate under a pressure of about 25 mm. Hg proceeds in the inlet 2 into the dialysate flow chamber 5b along the membrane 5 and out of the housing through the dialysate outlet 3. Blood under a pressure of about 75 mm. Hg (arterial pressure) proceeds on the other side of the membrane from the blood inlet 6 into the blood flow chamber 5a along the membrane 5 and then out the blood outlet 4. The fluid flows occurring in the blood flow have Reynolds numbers of about 10.

As the blood flow proceeds on one side of the membrane and dialysate flow proceeds on the other, dissolved wastes in the blood diffuse through the membrane into the dialysate fluid. At the same time, excess water in the blood passes through the membrane by ultrafiltration, leaving the blood relatively clean.

The flow path is only 10 inches long and the membrane has an area approximately equal to that of the conventional Kiil kidney of 0.9 square meter. However, the clearance rate of the instant assembly is approximately 1.6 times that of a comparable Kiil kidney.

Figure 2:
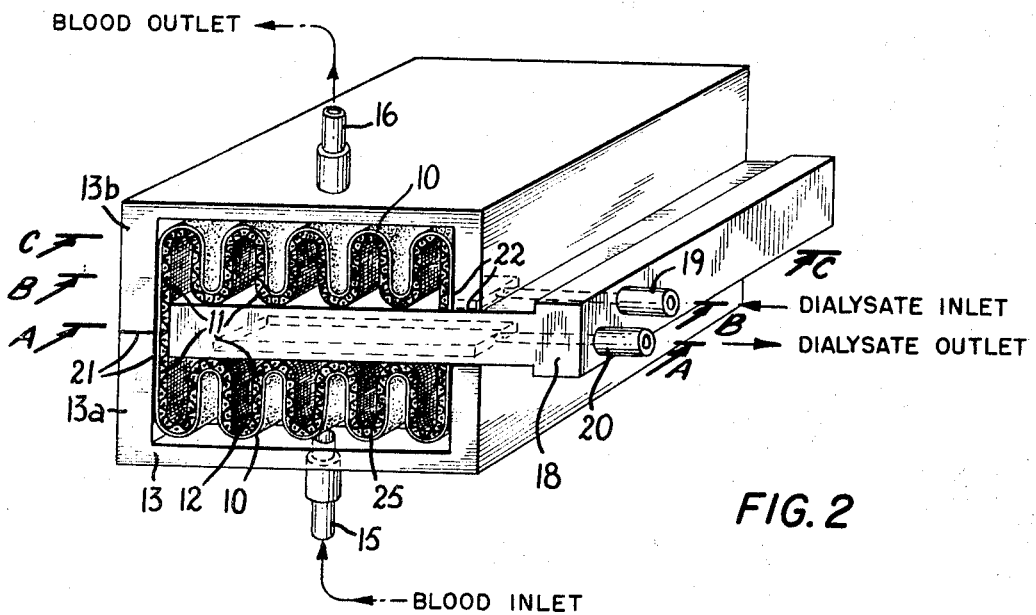
FIGURE 2 is a view in perspective and partially in cross-section of another embodiment of an artificial kidney in accordance with this invention.

The embodiment shown in FIGURE 2 is the preferred embodiment of this invention. In this embodiment, the membrane is both convoluted and corrugated. By this construction, it is possible to reduce the length of the housing to one half that of the previous embodiment. Moreover, the clearance rate is increased by about 25% for the same area and corrugation spacing over that of the previous embodiment.

In the embodiment shown in FIGURE 2, the membrane 10 is formed in a plurality of corrugations 12 and into one convolution having two convolution sides 11. The housing 13 is formed in two sections 13a and 13b and is provided with a blood inlet 15 on section 13a thereof and a blood outlet 16 on section 13b thereof. A flat dialysate manifold 18 having a dialysate inlet 19 and a dialysate outlet 20 extends through and forms a portion of the side of the housing 13. It is located between the sides 11 of the convolution of the membrane 10 and extends transversely across the housing for the entire length thereof.

The membrane 10 is bonded at the end of the manifold to the housing 13 by a resin 20.

The membrane is also bonded at its ends to the manifold 18 and to the housing 13 at the other end of the manifold by a resin bond 22.

This membrane is formed into 31 corrugations per inch of 5/8 inch depth, which are spaced 0.008 inch apart. The membrane is 0.001 inch thick and supported by a corrugated plastic mesh 25 similar to that described above in connection with the previous embodiment. The mesh is made of plastic and is formed in a plurality of corrugations which match and provide support for the corrugations of the membrane. The openings of the mesh are about 0.005 inch.

Figure 3:
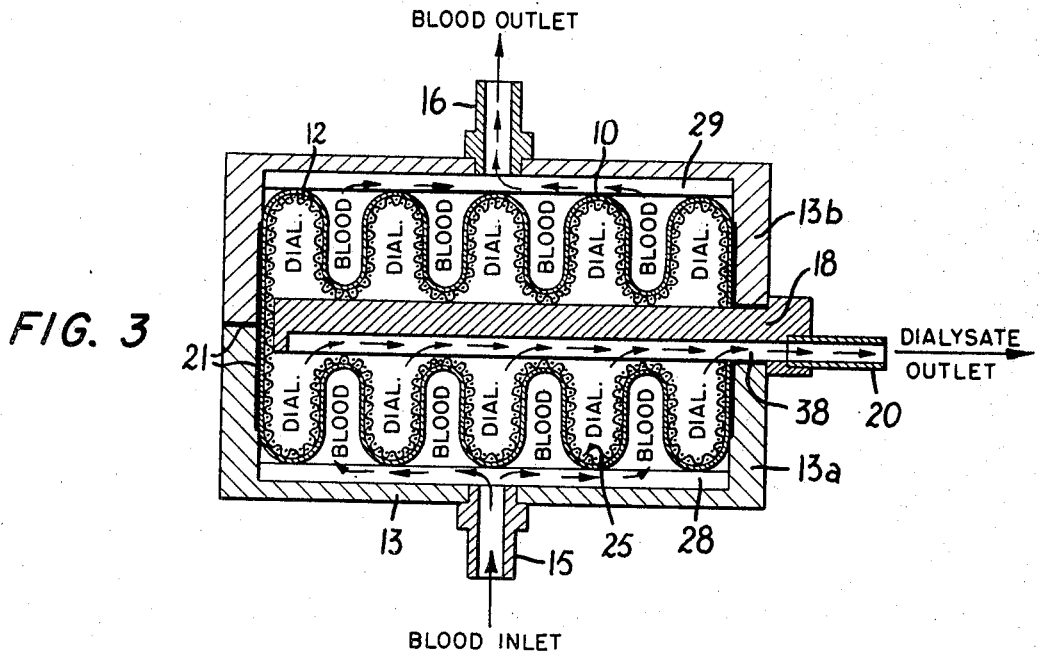
FIGURE 3 is a view in cross-section taken along the line A—A of FIGURE 2.
Figure 4:
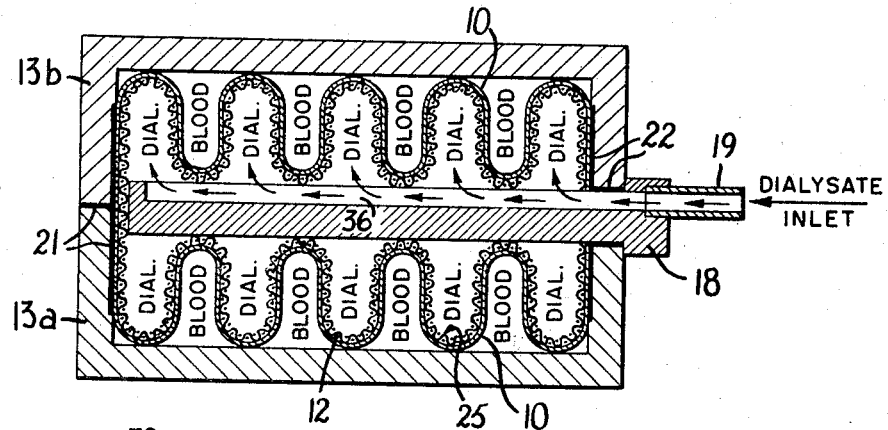
FIGURE 4 is a view in cross-section taken along the line B—B of FIGURE 2.
Figure 5:
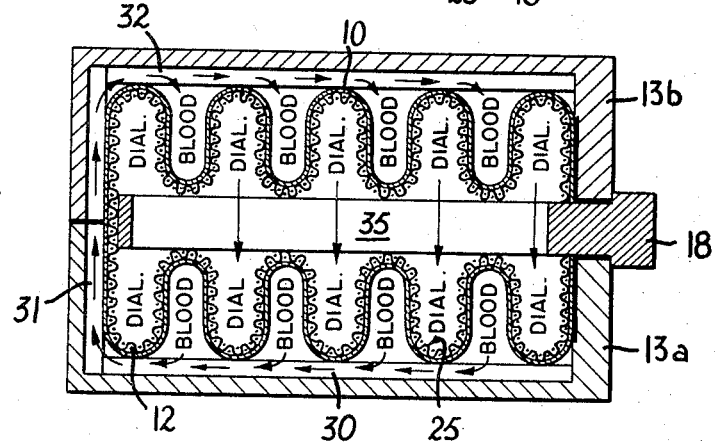
FIGURE 5 is a view in cross-section taken along the line C—C of FIGURE 2.

The housing is divided by the dialysate manifold and the membrane into two blood flow passages and two dialysate flow passages. These passages communicate by channels in the housing which are located at the opposite end of the housing from the inlet and outlet. Fluid can pass from the inlet to the outlet only by flowing along the length of the corrugations of the membrane to and through the channels and back along the membrane in the opposite direction. These channels can best be seen by reference to FIGURES 3 through 5.

A cavity 28 in the housing section 13a receives blood flow from the inlet. A similar cavity 29 is formed at the same end of the housing but in the other section 13b thereof for blood flow to the outlet. This can best be seen by reference to FIGURE 3. The blood, since it cannot pass through the membrane, communicates with the outlet by flowing along the corrugations of the membrane to the opposite end of the housing until it encounters the channel system 30, 31 and 32 which are formed in the housing and which permits flow to pass to the upper section 13b of the housing from the lower portion 13a. This can best be seen by reference to FIGURE 5.

Flow is disrupted at the channel system which permits crossover of fluid. The length of the undisrupted effective flow path is measured to this point and is about 6 inches. Flow then continues in the opposite direction along the corrugations of the membrane until it reaches the outlet. Again, the effective flow path of this flow is about 6 inches. The blood flow then proceeds along the corrugations of the membrane to the outlet.

Dialysate flow enters and leaves the housing through the dialysate manifold. The dialysate inlet 19 and a dialysate outlet 20 are at the same end of the manifold. However, the inlet 19 communicates with the upper flow passage of the membrane through a channel 36 in the manifold. The outlet 20 communicates with the lower flow passage through a channel 38 in the manifold. This can be seen by reference to FIGURES 3 and 4. A crossover channel 35 is provided in the opposite end of the manifold to permit dialysate fluid to pass from the upper to the lower flow passage. Dialysate flow proceeds along the membrane from the inlet until it encounters the crossover channel 35 which permits communication between the upper and lower dialysate flow passages on the interior of the convolution.

As in the previous embodiment, flow of blood and dialysate proceed countercurrently to each other on opposite sides of the membrane. However, parallel flow could also be used.

Dissolved wastes from the blood diffuse through the membrane to the dialysate fluid and excess water in the blood passes through the membrane by ultrafiltration leaving the blood relatively clean and waste-free.

The problem of leakage of fluid in the assembly is minimized since only one membrane rather than a plurality of membranes need be used.

The instant invention provides a compact assembly of very high clearance rate which reduces the required patient treatment time and blood volume. It is of low cost and is therefore disposable and has long shelf life. It is a substantial improvement over the assemblies heretofore known to the art.

Having regard to the foregoing disclosure, the following is claimed as the inventive and patentable embodiments thereof:

1. An artificial kidney comprising, in combination, a housing; a semipermeable dialysis membrane disposed in the housing in a manner to define separate blood flow and dialysate flow chambers on opposite sides of the membrane, said membrane being formed in at least one convolution having spaced apart sides, and a plurality of corrugations disposed along the convolution, said corrugations of the membrane being spaced a substantially uniform distance within the range from about 0.004 inch to about 0.012 inch apart on the blood flow side of the membrane; separator means in the housing disposed between the spaced apart sides with the corrugations of the membrane defining passages for flow of one fluid on one side of the membrane, the housing and the corrugations of the membrane defining passages for flow of the other fluid on the opposite side of the membrane; a first fluid inlet positioned to deliver fluid to one side of the separator means; a first fluid outlet positioned to receive fluid on the other side of the separator means and on the same side of the membrane; a second fluid inlet and second fluid outlet in the housing on the opposite side of the membrane; the inlets and the outlets delivering and receiving fluid to and from the passages, such that the fluid flow proceeds from each inlet to each outlet on the same side of the membrane along the corrugations for a unit length of not more than about 12 inches, the membrane providing a dialyzing connection between the flow passages so that dissolved wastes in the blood can diffuse through the membrane into the dialysate fluid, leaving the blood relatively waste-free.

2. An artificial kidney in accordance with claim 1, in which the membrane is made of regenerated cellulose.

3. An artificial kidney in accordance with claim 1, in which the housing is made of transparent plastic material.

4. An artificial kidney in accordance with claim 1, in which the Reynolds number of the blood flow is less than 100.

5. An artificial kidney in accordance with claim 1, in which the entire volume of the blood flow chamber in the housing is less than 300 ml.

6. An artificial kidney in accordance with claim 1, in which the housing is provided with a manifold for flow of one fluid, said manifold extending the entire length of the housing and between the sides of the convolution of the membrane.

7. An artificial kidney in accordance with claim 1, including a foraminous support for the membrane shaped to match the corrugations of the membrane.

8. An artificial kidney in accordance with claim 7, in which the support is located in the dialysate flow chamber.

9. An artificial kidney in accordance with claim 7, in which the support is a woven mesh.

10. An artificial kidney comprising, in combination, a housing; a semipermeable dialysis membrane disposed in the housing in a manner to define separate blood flow and dialysate flow passages on opposite sides of the membrane, said membrane being formed in at least one spaced apart convolution and a plurality of corrugations disposed along the convolution, said corrugations of the membrane being spaced a substantially uniform distance within the range from about 0.004 inch to about 0.012 inch apart on the blood flow side of the membrane; a manifold in the housing on one side of the membrane and between the sides of the convolution of the membrane, said manifold having a first flow inlet on one side thereof and a first flow outlet on the other side thereof, the manifold and the corrugations of the membrane defining passages for flow of one fluid on one side of the membrane between the inlet and the outlet; a second flow inlet and second flow outlet in the housing on the opposite side of the membrane, the housing and the corrugations of the membrane defining passages for flow of the other fluid on the opposite side of the membrane, the inlet and the outlet being located in the housing and in the manifold to deliver and receive flow to and from the passages, the flow proceeding from each inlet to each outlet along the corrugations for a unit length of not more than about 12 inches, the membrane providing a dialyzing connection between the flow passages so that dissolved wastes in the blood can diffuse through the membrane into the dialysate fluid leaving the blood relatively waste-free.

11. An artificial kidney in accordance with claim 10, in which the membrane is provided with a foraminous support formed in a shape to match the corrugations of the membrane.

12. An artificial kidney in accordance with claim 10, in which the manifold comprises a flat plate having a crossover passage therethrough.

13. An artificial kidney in accordance with claim 10, in which the housing is provided with crossover passages for flow from the inlet to the outlet.

14. An artificial kidney in accordance with claim 10, in which the manifold flow inlet and manifold flow outlet are at one end of the manifold and communicate respectively with the flow passages on opposite sides of the manifold.

15. An artificial kidney in accordance with claim 10, comprising, in combination, a transparent plastic housing, a semipermeable dialysis membrane disposed in the housing in a manner to define separate blood flow and dialysate flow passages on opposite sides of the membrane, said membrane being formed in one convolution and in a plurality of corrugations along the convolution, said corrugations being spaced a substantially uniform distance within the range from about 0.006 to about 0.010 inch apart on the blood flow side of the membrane; a foraminous support shaped to match the corrugations of the membrane and support the membrane in the housing in a manner to maintain the spacing of the corrugation surfaces substantially the same under the differential pressure between the blood and the dialysate fluid; a dialysate manifold extending transversely across the housing between the sides of the convolution of the membrane and along the length of the corrugations of the membrane, said manifold dividing the housing into upper and lower sections with passages for blood flow and dialysate flow in each section, the manifold and the corrugations and the housing defining a set of dialysate and blood flow passages in each section, said manifold having a first flow inlet and a first flow outlet at the same end thereof, said first flow inlet and first flow outlet communicating with one set of flow passages on the same side of the membrane and on each side of the manifold; a crossover passage in the manifold to permit fluid to pass from one set of flow passages in one section of the housing to the corresponding set of flow passages in the other section; a second flow inlet in one section of the housing and a second flow outlet in the other section of the housing; crossover passages in the housing to permit fluid to pass from a second set of flow passages in one section of the housing to a second set of flow passages in the other section of the housing, said first and second flow inlets and first and second flow outlets being located at opposite ends of the housing from the crossover passages, such that fluids flow from the inlets along the length of and between the corrugation surfaces to the respective crossover passages and then proceed to the corresponding passages in the other section of the housing and along the length of and between the corrugation surfaces in the opposite direction to the respective outlets, said blood flow passages extending for a unit length not exceeding 12 inches and the membrane providing a dialyzing connection between the flow passages so that dissolved waste in the blood can diffuse through the membrane into the dialysate fluid leaving the blood relatively waste-free.

References Cited

UNITED STATES PATENTS

| | | | |
|---|---|---|---|
| 3,326,380 | 6/1967 | Fenchner et al. | 210—321 X |
| 3,370,710 | 2/1968 | Bluemle | 210—993 X |

FOREIGN PATENTS

| | | |
|---|---|---|
| 781,864 | 8/1957 | Great Britain. |
| 880,427 | 8/1961 | Great Britain. |

REUBEN FRIEDMAN, *Primary Examiner.*

FRANK A. SPEAR, JR., *Assistant Examiner.*

U.S. Cl. X.R.

210—493

PO-1050
(5/69)

UNITED STATES PATENT OFFICE
CERTIFICATE OF CORRECTION

Patent No. 3,442,388                               Dated   May 6, 1969

Inventor(s)   David B. Pall

It is certified that error appears in the above-identified patent and that said Letters Patent are hereby corrected as shown below:

Column 1, line 45, "suffers" should read -- sufferers --.

Column 2, line 56, "dimension" should read -- dimensions --.

Column 2, line 58, "long" should read -- along --.

Column 5, line 63, "12 inches" should read -- 10 inches --.

Column 6, line 17, "mmebrane" should read -- membrane --.

Column 9, line 10, after the word "can" insert -- best --.

SIGNED AND
SEALED

SEP 30 1969

(SEAL)
Attest:

Edward M. Fletcher, Jr.
Attesting Officer

WILLIAM E. SCHUYLER, JR.
Commissioner of Patents